May 31, 1960    A. A. CAVALIER ET AL    2,938,644
ASSEMBLY OF SPHERICAL CONTAINERS
Filed March 6, 1959    2 Sheets-Sheet 1
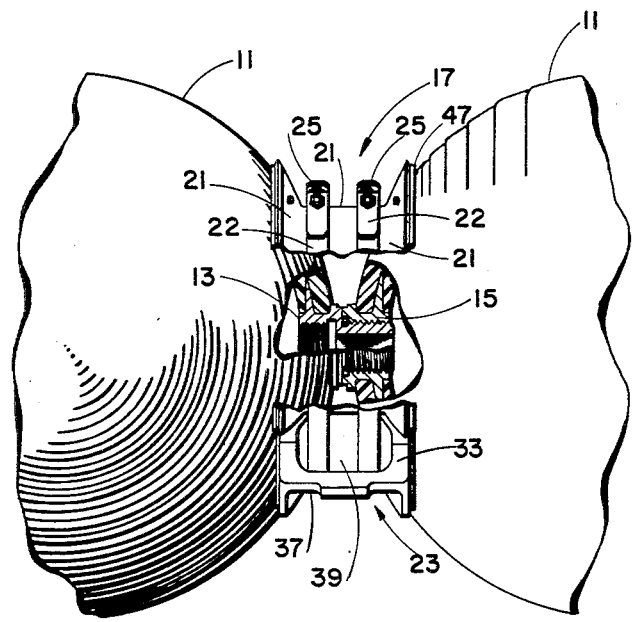
FIG. I
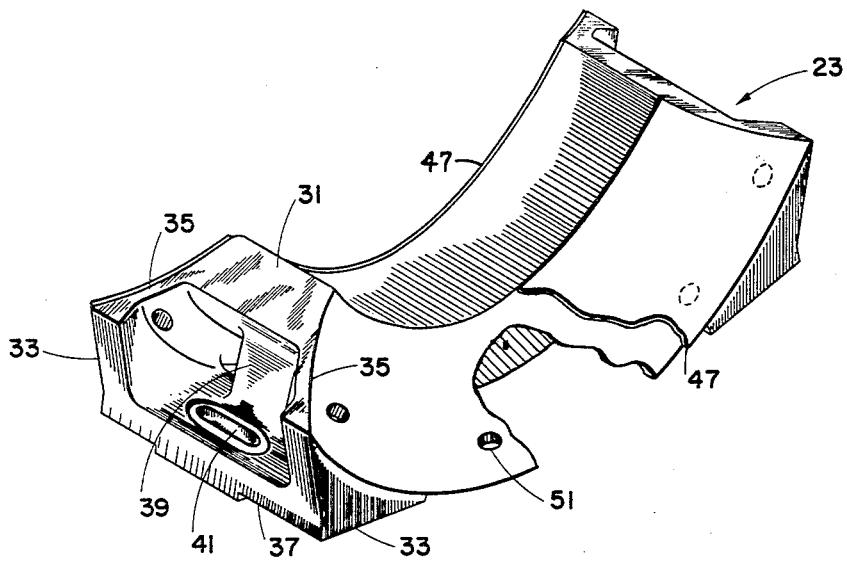
FIG. II
INVENTORS
ALPHONSE A. CAVALIER
DONALD J. COAN
BY Robert W. Ely
ATTORNEY May 31, 1960   A. A. CAVALIER ET AL   2,938,644
ASSEMBLY OF SPHERICAL CONTAINERS
Filed March 6, 1959   2 Sheets-Sheet 2
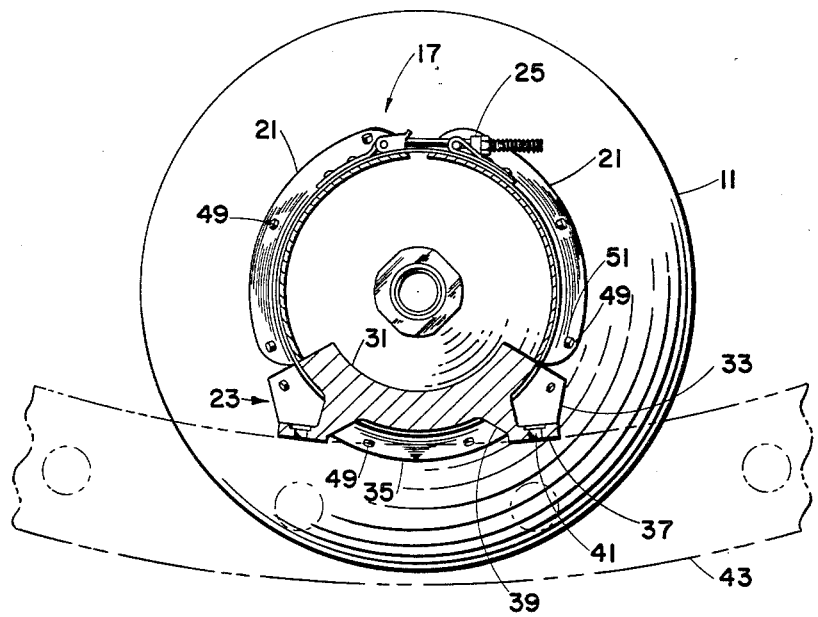
FIG. III
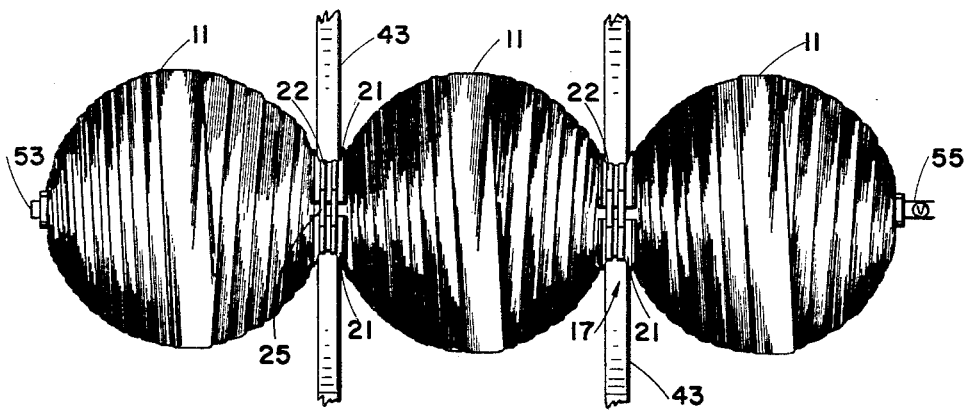
FIG. IV
INVENTORS
ALPHONSE A. CAVALIER
DONALD J. COAN
BY Robert W. Ely
ATTORNEY

United States Patent Office 2,938,644
Patented May 31, 1960

2,938,644
ASSEMBLY OF SPHERICAL CONTAINERS

Alphonse A. Cavalier and Donald J. Coan, Utica, N.Y., assignors to Bendix Aviation Corporation, Utica, N.Y., a corporation of Delaware Filed Mar. 6, 1959, Ser. No. 797,713

6 Claims. (Cl. 220—3)

This invention relates to containers for fluids such as compressed air and more particularly concerns two or more spherical containers which are in-line manifolded.

An object of the present invention is to provide an in-line assembly of spherical containers which can be easily made and firmly attached to support members of a missile, space vehicle aircraft or other vehicle.

A further object is the provision of such an in-line assembly having means for attaching which prevent rotation on the longitudinal in-line axis of the spheres.

Another object is to provide an in-line assembly of spheres having reliable clamping-attaching means which extends between facing surfaces of adjacent spheres.

The realization of the above objects along with the features and advantages of the invention will be apparent from the following description and the accompanying drawings in which:

Fig. I is a partially-cross-sectioned side viewed of two spherical containers connected by fittings and means for clamping and attaching the spheres as an assembly to a structural rib of a missile;

Fig. II is a perspective view of the anchor clamp which appears at the bottom in Fig. I;

Fig. III is a transverse showing at the junction of the fittings and shows the coaction of the two brace clamps, the tensioning strap and the anchor clamp which will be attached to a support member and Fig. IV is a side view of an assembly of three spheres with parts shown schematically and shows the longitudinal location of the support members between spheres.

Referring to Fig. I of the drawing, it can be seen that spheres or spherical containers 11 are connected at adjacent facing ends by sealed fittings 13, 15 which provide axial fluid communication between spheres 11. Tubular fitting 13 is threaded into fitting 15 and both fittings are fastened in the end walls of the spheres which are made from resin-impregnated fiberglass windings. Attaching-clamping means 17 extends axially between facing surfaces of the spheres and surrounds the fittings 13, 15. The attaching-clamping means 17 extends between the facing ends or cap portions around the fittings of the spheres 11. The ends or cap portions of the spheres are those curved surfaces which have an outer diameter which is less than two-thirds of the diameter of the spheres 11. Means 17 is comprised of two identical sheet metal brace clamps 21, two tensioning straps 22 and one anchor clamp 23 at the bottom as seen in Fig. 1. Anchor clamp 23 is adapted to be connected to a support member in a manner which will be described. Each strap 22 has an adjustable connector 25 for connecting the ends of the straps and for tensioning the straps so that the circularly-arranged clamps are urged firmly into contact with the facing ends of the spheres 11 to restrain lateral and/or rotational movement.

From Figs. I—III, it can be seen that the anchor clamp 23 is a casting and that the two brace clamps 21 are arcuate and have a generally U-shaped longitudinal cross-section whereby an arcuate base and two arcuate outwardly inclined side walls are provided. The arcuate anchor clamp 23 has a similar cross-section but is a relatively-heavy aluminum casting, rather than of sheet metal construction, whereby a heavy base or center section 31 is provided. Anchor clamp 23 has an integral mounting structure at each end which is comprised of two triangularly-shaped flanges 33 extending radially-outwardly from the end parts of the inclined walls 35, an attaching plate 37 extending longitudinally between the flanges 33 and a radially-extending strut 39. Plate 37 has an attaching or mounting opening 41 at the center therefor for a connector (not shown) for attaching the assembly to a structural element 43 such as outlined in Fig. III. Strut 39 extends from the inner central part of the plate 37, back of opening 41, to the heavy base 31 whereby two openings for the straps 22 are provided in the anchor clamp 23. It is apparent that clamp 23 provides firm anchoring and withstands vibrations.

As above-mentioned, the spherical containers 11 are made from fiberglass windings and hence have surfaces which have ridges. These ridged-surfaces are illustrated in Fig. IV. In order to provide better clamp engagement with such surfaces, the clamps 21 and 23 have deformable plastic or elastomer pads 47 which accommodate the ridges in the spherical wall. The pads 47 have circular projections 49 which fit into holes 51 in the clamps to provide for attaching along with conventional cementing.

It is to be noted that, with reference to Fig. III, the ends of the anchor clamp 23 are in contact with the adjacent ends of the brace clamps 21. The other ends of the brace clamps 21 are spaced from each other and are drawn radially-inwardly slightly toward the anchor clamp 23 which is held fixed when the tensioning straps 22 are tightened. This arrangement further restrains longitudinal rotation of the containers 11 as a unit or relative to each other.

In Fig. IV, the assembly of three spherical containers 11 and two clamping-attaching means 17 is depicted as connected to two spaced support elements 43 of a missile by the present anchor clamps which do not appear. It is apparent that the assembly is free of attaching projections and any connector (exterior of the assembly envelope) which could be hit and thus might damage the fittings of the spherical containers 11. The enveloped-recessed attaching means 17 restrain the manifolded containers from lateral or longitudinal movement and prevent vibration-induced rotation on the longitudinal axis. The left container 11 has a plug 53 in its exposed end while the right container is fitted with a valve 55 so that high pressure air or the like can be charged and then used during flight.

The manner of using the fluid supply assembly of the present invention is believed to be apparent from the foregoing. High pressure air or other fluid can be charged through valve 55 into the spherical containers 11 and used as required by releasing through valve 55. The in-line manifolding of spherical containers and the separable surface-contacting attaching means 17 between the ends of the containers provide ease in fabricating and efficient use of space. Reliable attachment is provided by the brace clamps 21, the tensioning straps 22 and the cast anchor clamp 23 having integral mounting structure. Further, the clamping provided by the attaching means 17 restrains the assembly (when subject to vibration or other action) from longitudinal rotation and the containers 11 from relative rotation.

It is to be understood that persons skilled in the art can make changes in the disclosed embodiment of the invention without departing from the invention as set forth in the appended claims.

What is claimed is:

1. An assembly for fluid storage comprised of three spherical containers arranged in-line on a common axis so that there are two sets of axially-facing adjacent ends, manifolding means attached to each set of adjacent ends connecting said ends and providing fluid communication between adjacent containers, attaching-clamping means radially outward of each of said manifold means and extending between each set of said facing ends for attaching the containers to a support element, each of said attaching-clamping means including two arcuate brace clamps and one arcuate anchor clamp, said clamps being circularly-arranged, each clamp having surfaces in contact with the facing ends of said containers, said attaching-clamping means further including tensioning strap means extending around said clamps and maintaining said clamps in position so that the containers are restrained from rotating on the common axis, and said anchor clamp being a casting and having a radially-extending integral mounting structure constructed to accommodate said strap means and to provide for attachment to support members between adjacent containers.

2. The assembly according to claim 1 and being further characterized by said spherical containers being made from resin-impregnated windings of glass fibers so that the surfaces of the spherical containers have ridges and by said brace clamps and said anchor clamp having plastic pads which accommodate said ridges on the facing surfaces of said containers.

3. The assembly according to claim 1 and being further characterized by the ends of said anchor clamp being in contact with the adjacent ends of said brace clamps, the other ends of said brace clamps being spaced from each other and being drawn radially inwardly slightly toward said anchor clamp by said strap means.

4. An assembly for fluid storage comprised of two spherical containers having diametrically-located fittings, said containers being connected and manifolded by said fittings whereby said containers are arranged in-line on a common axis, attaching-clamping means extending axially between the facing ends of said containers for attaching the assembly to a structural member, said means including an arcuate anchor clamp, two arcuate brace clamps and tensioning means, said clamps being circularly-arranged and having curved surfaces in contact with the facing ends of said containers, said clamps having axially-extending exterior surfaces on a common diameter, said tensioning means being positioned on said exterior surfaces and urging said curved surfaces against the facing ends of said containers, said anchor clamp being a metal casting and having at each end an integral axially-extending mounting plate which has a mounting opening in the central part thereof, said anchor clamp being formed with a radial strut extending to said mounting plate inwardly of said mounting opening.

5. An assembly for fluid storage comprised of a plurality of spherical containers arranged in-line on a common axis to provide axially-facing adjacent ends manifold means connecting said adjacent ends and providing fluid communication between adjacent containers, attaching means radially outward of said manifold means and extending between adjacent ends of said containers for attaching the containers to a support element, said attaching means including three arcuate clamps and tensioning means, said clamps being circularly arranged and having inclined surfaces in contact with the facing ends of said containers, said tensioning means extending around said clamps ad maintaining said clamps in position, one of said clamps being an anchor clamp which is formed as a metal casting, said cast anchor clamp having a heavy arcuate center section and two inclined arcuate walls extending from said center section, said inclined walls providing the anchor clamp surfaces which are in contact with the facing ends of said containers, the ends of said anchor clamp having integral mounting structure, said mounting structure including an axially-extending mounting plate spaced from said center section and connected to the ends of said inclined walls, said mounting plate having a centrally-located opening for an attaching device and said mounting structure further including a strut connecting the inner central part of said mounting plate to said center section so that openings at each side of said strut are provided for said tensioning means.

6. An assembly for fluid storage comprised of three spherical containers arranged in-line on a common axis so that there are two sets of axially-facing adjacent ends, manifolding means attached to each set of adjacent ends connecting said ends and providing fluid communication between adjacent containers, attaching-clamping means radially outward of each of said manifold means and extending between each set of said facing ends for attaching the containers to a support element, each of said attaching-clamping means including two arcuate brace clamps and one arcuate anchor clamp, said clamps being circularly-arranged, each clamp having surfaces in contact with the facing ends of said containers, said attaching-clamping means further including tensioning strap means extending around said clamps and maintaining said clamps in position, said anchor clamp and said brace clamps having a generally U-shaped longitudinal cross section whereby an arcuate base and two arcuate inclined side walls are provided, said side walls providing said surfaces in contact with the facing ends of said containers, said anchor clamp being a casting and having thick base, the ends of said anchor clamps having an integral mounting structure, said mounting structure including two triangularly-shaped flanges extending radially-outwardly from the ends of the anchor clamp side walls and a mounting plate extending longitudinally between the ends of said flanges, said mounting structure further including a strut extending radially from the inner central part of said plate to said anchor clamp base whereby two openings are provided at each side of said strut, a centrally-located opening through said plate outward of said strut for attaching to a support member, said tensioning strap means including two straps having an adjustable connector, said straps passing through the openings at each side of the struts and along the exterior surfaces of said clamp bases whereby the assembly is easily attached to support members at locations between adjacent containers and whereby the containers are restrained from rotating on the common axis.

No references cited.